(12) United States Patent
Cornett et al.

(10) Patent No.: US 9,604,838 B2
(45) Date of Patent: Mar. 28, 2017

(54) BREAKAWAY COUPLING MONITORING (71) Applicant: Veeder-Root Company, Simsbury, CT (US)

(72) Inventors: Kenneth D. Cornett, Simsbury, CT (US); Tim Campaigne, Houston, TX (US); James C. Little, Avon, CT (US); Niranjan Srinivasan, Beavercreek, OH (US); Andres Deogracias Viduya, Hollidaysburg, PA (US); Jeremy Baillargeon, Southington, CT (US); Cameron D. Carmack, Tipp City, OH (US)

(73) Assignee: Veeder-Root Company, Simsbury, CT (US)

( * ) Notice: Subject to any disclaimer, the term of this patent is extended or adjusted under 35 U.S.C. 154(b) by 0 days.

(21) Appl. No.: 15/019,295

(22) Filed: Feb. 9, 2016

(65) Prior Publication Data
US 2016/0229680 A1 Aug. 11, 2016

Related U.S. Application Data (60) Provisional application No. 62/113,677, filed on Feb. 9, 2015.

(51) Int. Cl.
*B67D 7/32* (2010.01)
*B67D 7/04* (2010.01)

(52) U.S. Cl.
CPC ............ *B67D 7/3218* (2013.01); *B67D 7/04* (2013.01)

(58) Field of Classification Search
CPC . B67D 7/3218; F16L 55/1015; F16L 55/1007

USPC ............ 141/94, 207, 209; 251/149.1, 149.6; 137/68.11, 68.14, 68.15, 68.18
See application file for complete search history.

(56) References Cited

U.S. PATENT DOCUMENTS

| | | | |
|---|---|---|---|
| 3,181,895 A | 5/1965 | Cator |
| 3,586,048 A | 6/1971 | Arnold |
| 3,756,085 A | 9/1973 | Hunter |
| 4,049,295 A | 9/1977 | Piers |

(Continued)

OTHER PUBLICATIONS

International Search Report and Written Opinion of the International Searching Authority dated Apr. 14, 2016 for corresponding International App. No. PCT/US2016/017090.

*Primary Examiner* — Timothy L Maust
*Assistant Examiner* — Timothy P Kelly
(74) *Attorney, Agent, or Firm* — Nelson Mullins Riley & Scarborough, LLP (57) ABSTRACT

A coupling comprising a first body member and a second body member. The first and second body members are operative to releasably connect together. The first and second body members define a fluid flow path therein when the first and second body members are connected together. The first and second body members are operative to disconnect from one another in response to a predetermined tensile force. At least one valve member is disposed within at least one of the first and second body members and is movable from an open position to a closed position with respect to the fluid flow path upon disconnection of the first body member from the second body member. A sensor is disposed within one of the first and second body members and is operative to sense whether the first and second body members are connected together.

19 Claims, 5 Drawing Sheets

(56) References Cited

U.S. PATENT DOCUMENTS

| | | |
|---|---|---|
| 4,498,606 A | 2/1985 | DiRienzo |
| 4,691,941 A | 9/1987 | Rabushka et al. |
| 4,763,683 A | 8/1988 | Carmack |
| 4,998,560 A * | 3/1991 | Le Devehat ......... B67D 7/3218 137/615 |
| 5,040,577 A | 8/1991 | Pope |
| 5,184,309 A | 2/1993 | Simpson et al. |
| 5,346,260 A | 9/1994 | Meyer-Berg et al. |
| 5,419,354 A | 5/1995 | Krynicki |
| 5,433,247 A | 7/1995 | Guertin |
| 5,689,071 A | 11/1997 | Ruffner et al. |
| 5,734,851 A | 3/1998 | Leatherman et al. |
| 5,954,080 A | 9/1999 | Leatherman |
| 5,956,259 A | 9/1999 | Hartsell, Jr. et al. |
| 6,052,629 A | 4/2000 | Leatherman et al. |
| 6,334,474 B1 | 1/2002 | Rababy et al. |
| 6,435,204 B2 | 8/2002 | White et al. |
| 6,899,131 B1 | 5/2005 | Carmack et al. |
| 6,935,191 B2 | 8/2005 | Olivier et al. |
| 7,010,961 B2 | 3/2006 | Hutchinson et al. |
| 7,240,927 B2 | 7/2007 | Chang |
| 7,252,112 B1 | 8/2007 | Imler et al. |
| 7,289,877 B2 | 10/2007 | Wilson |
| 7,487,796 B2 | 2/2009 | Imler et al. |
| 8,291,928 B2 | 10/2012 | Reid et al. |
| 2002/0170596 A1 | 11/2002 | Krywitsky |
| 2005/0028610 A1 | 2/2005 | Olivier et al. |
| 2013/0025698 A1 | 1/2013 | Safi-Samghabadi et al. |
| 2013/0181867 A1 | 7/2013 | Sturdivant et al. |
| 2014/0116515 A1 | 5/2014 | Konishi |

* cited by examiner

BREAKAWAY COUPLING MONITORING

PRIORITY CLAIM

This application claims the benefit of U.S. Provisional Application Ser. No. 62/113,677, titled "Breakaway Coupling Monitoring," filed Feb. 9, 2015, which is hereby relied upon and incorporated in its entirety herein by reference for all purposes.

BACKGROUND

The present invention relates generally to equipment used in fuel dispensing environments. More specifically, embodiments of the present invention relate to a breakaway coupling comprising a first member, a second member, and a separation detection assembly operative to detect separation of the first member from the second member. In some embodiments, the separation detection assembly may also comprise an alarm and/or communication electronics for notifying appropriate personnel that separation has occurred.

Breakaway couplings for protecting fuel dispensing equipment are well known. Breakaway couplings usually have male and female members which are releasably retained together by various means, such as by shear pins, an annular coil spring, a detent biased by a restoring spring, and permanent magnets. These couplings are often provided between a fuel dispensing nozzle and a fuel dispensing hose or between the fuel dispensing hose and a shorter length of hose attached to a fuel dispenser. In general, such couplings protect fuel dispensing equipment from damage by decoupling when tensile forces are applied to the fuel dispensing hose, for example when a vehicle's driver drives away from the fuel dispenser having failed to remove the fuel dispensing nozzle from the vehicle's fuel tank inlet. Further, breakaway couplings typically comprise internal valve members that, upon uncoupling, move to their closed positions to prevent the release of fuel from the coupling components and attached equipment. Breakaway couplings have been constructed with a single fuel supply passage for a non-vapor recovery fuel dispenser and with both a fuel supply passage and a vapor return passage for a vapor recovery fuel dispenser. Additional background information regarding the construction and operation of prior art breakaway couplings is provided in U.S. Pat. Nos. 7,487,796; 7,252,112; 7,240,927; 6,899,131; 5,433,247; 5,419,354; 5,346,260; 4,763,683; 4,691,941; 4,049,295; 3,586,048; and 3,181,895, the disclosures of each of which are incorporated by reference herein in their entireties for all purposes.

SUMMARY

The present invention recognizes and addresses various considerations of prior art constructions and methods. According to one embodiment, the present invention provides a coupling, comprising a first body member and a second body member. The coupling also comprises a coupling system operative to releasably connect the first body member with the second body member and that allows the second body member to move from a coupled position to an uncoupled position with respect to the first body member in response to a predetermined tensile force. The first and second body members define a fluid flow path therein when the second body member is in the coupled position. The coupling further comprises a sensor assembly coupled with the first body member and comprising at least one sensor operative to detect that the second body member has moved to the uncoupled position.

According to another embodiment, the present invention provides a fluid dispenser comprising a housing and a control system. The fluid dispenser also comprises a fluid flow path terminating at a fluid dispensing nozzle. A coupling is disposed along the fluid flow path upstream of the fluid dispensing nozzle and downstream of the housing. The coupling comprises a first body member and a second body member, the first and second body members releasably connected together and operative to disconnect from one another in response to a predetermined force. The coupling further comprises a sensor that is operative to sense whether the first and second body members are connected together and communications electronics in electronic communication with the control system.

In yet another embodiment, the present invention provides a coupling comprising a first body member and a second body member. The first and second body members are operative to releasably connect together. The first and second body members define a fluid flow path therein when the first and second body members are connected together. The first and second body members are operative to disconnect from one another in response to a predetermined tensile force. At least one valve member is disposed within at least one of the first and second body members and is movable from an open position to a closed position with respect to the fluid flow path upon disconnection of the first body member from the second body member. A sensor is disposed within one of the first and second body members and is operative to sense whether the first and second body members are connected together.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one skilled in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure including the appended claims and their equivalents.

Some embodiments of the present invention may be particularly suitable for use with a fuel dispenser in a retail service station environment, and the below discussion will describe some preferred embodiments in that context. However, those of skill in the art will understand that the present invention is not so limited. In fact, it is contemplated that embodiments of the present invention may be used with any fluid dispensing environment and with fluid dispensing equipment (such as nozzles and fluid dispensing hoses) associated with other fluid dispensers. For example, embodiments of the present invention may also be used with equipment associated with diesel exhaust fluid (DEF) dispensers, compressed natural gas (CNG) dispensers, and liquefied petroleum gas (LPG) and liquid natural gas (LNG) applications, among others. Moreover, those of skill in the art will appreciate that embodiments of the present invention may be used in any environment in which it may be necessary or desirable to provide a breakaway coupling between upstream and downstream portions of a fluid conduit or path.

Figure 1:
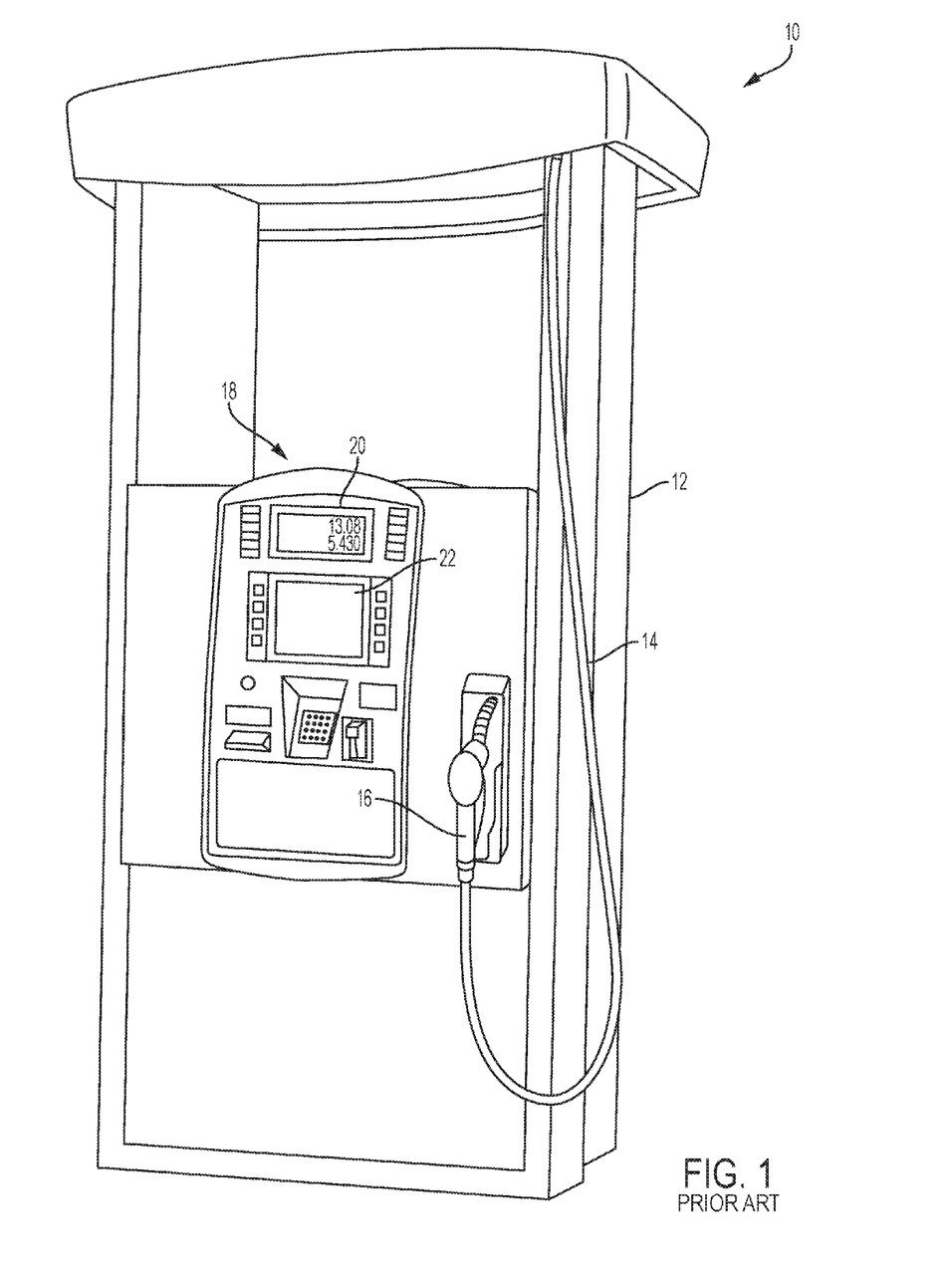
FIG. 1 is a perspective view of a prior art fuel dispenser for use in a retail service station environment.

FIG. 1 is a perspective view of a prior art fuel dispenser 10 adapted for use in a retail service station environment. Fuel dispenser 10 may be similar to, for example, the ENCORE® dispenser sold by Gilbarco Inc. of Greensboro, N.C. Fuel dispenser 10 includes a housing 12 with a flexible fuel hose 14 extending therefrom. Fuel hose 14 terminates in a manually-operated nozzle 16 adapted to be inserted into a fill neck of a vehicle's fuel tank. Nozzle 16 includes a fuel valve. Various fuel handling components, such as valves and meters, are also located inside of housing 12. These fuel handling components allow fuel to be received from underground piping and delivered through hose 14 and nozzle 16 to a vehicle's tank, as is well understood.

Fuel dispenser 10 has a customer interface 18. Customer interface 18 may include an information display 20 relating to an ongoing fueling transaction that includes the amount of fuel dispensed and the price of the dispensed fuel. Further, customer interface 18 may include a media display 22 to provide advertising, merchandising, and multimedia presentations to a customer in addition to basic transaction functions. The graphical user interface provided by the dispenser allows customers to purchase goods and services other than fuel at the dispenser. Further, display 22 may provide instructions to the customer regarding the fueling transaction. Further information on and examples of fuel dispensers and retail fueling environments are provided in U.S. Pat. Nos. 6,435,204; 5,956,259; 5,734,851; 6,052,629; 5,689,071; 6,935,191; and 7,289,877, all of which are incorporated herein by reference in their entireties for all purposes.

Figure 2:
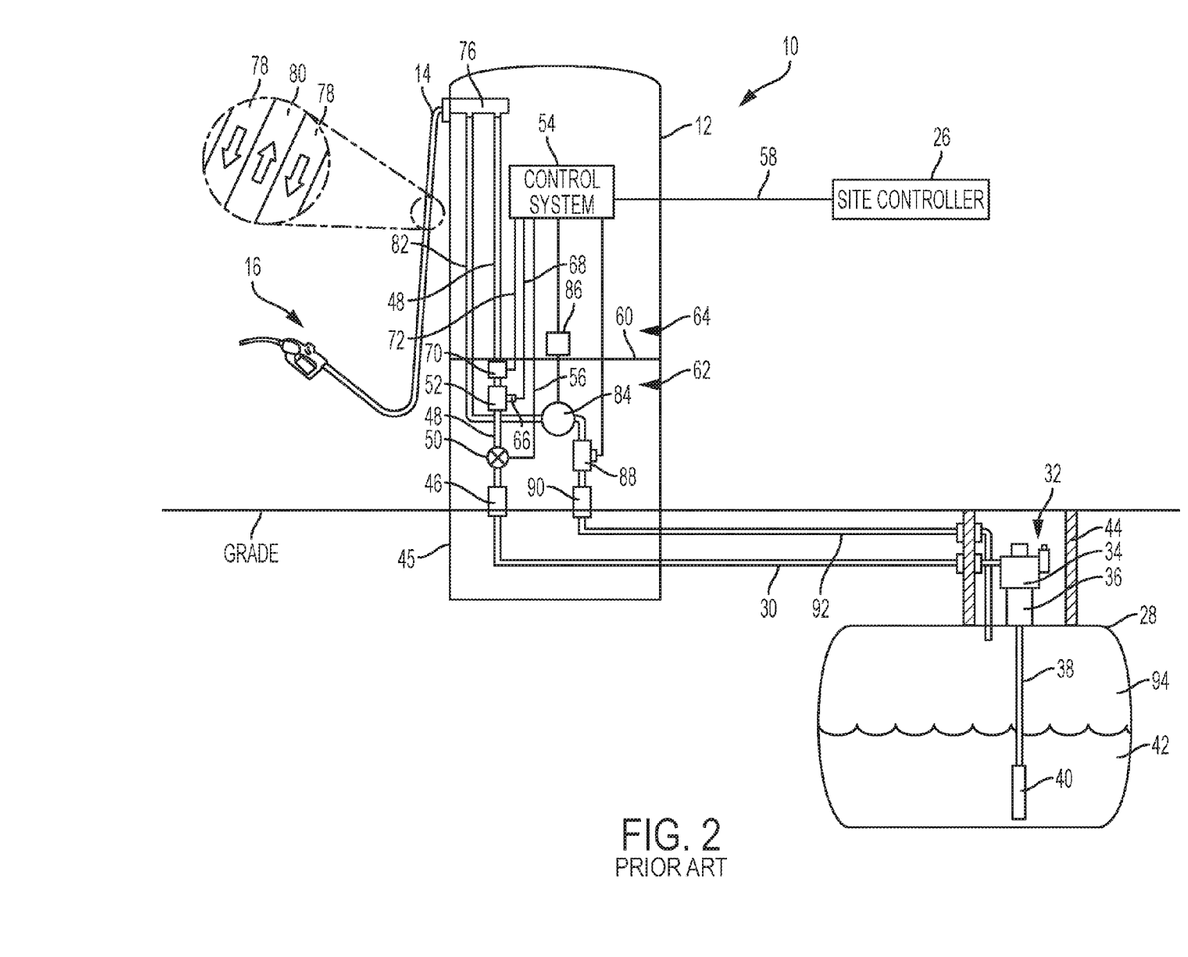
FIG. 2 is a schematic illustration of a prior art fuel dispensing system including the dispenser of FIG. 1.

FIG. 2 is a schematic illustration of a prior art fuel dispensing system in a retail service station environment. In general, fuel may travel from an underground storage tank (UST) 28 via main fuel piping 30, which may be a double-walled pipe having secondary containment as is well known, to fuel dispenser 10 and nozzle 16 for delivery. An exemplary underground fuel delivery system is illustrated in U.S. Pat. No. 6,435,204, hereby incorporated by reference in its entirety for all purposes.

More specifically, a submersible turbine pump (STP) 32 associated with the UST 28 is used to pump fuel to the fuel dispenser 10. However, some fuel dispensers may be self-contained, meaning fuel is drawn to the fuel dispenser 10 by a pump controlled by a pump unit positioned within housing 12.

STP 32 is comprised of a distribution head 34 containing power and control electronics that provide power through a riser 36 down to a boom 38 inside the UST 28, eventually reaching a turbine pump contained inside an outer turbine pump housing 40. STP 32 may preferably be the RED JACKET® submersible turbine pump, manufactured by the Veeder-Root Co. of Simsbury, Conn. Also, STP 32 may contain a siphon that allows the STP 32 to generate a vacuum using the force of fuel flow. In addition, riser 36 and distribution head 34 may be secondarily contained to capture and monitor leaks. For example, such a system is disclosed in U.S. Pat. No. 7,010,961, hereby incorporated by reference in its entirety for all purposes. As noted above, there may be a plurality of USTs 28 and STPs 32 in a service station environment if more than one type or grade of fuel 42 is to be delivered by a fuel dispenser 10.

The turbine pump operates to draw fuel 42 upward from the UST 28 into the boom 38 and riser 36 for delivery to the fuel dispenser 10. After STP 32 draws the fuel 42 into the distribution head 34, the fuel 42 is carried through STP sump 44 to main fuel piping 30. Main fuel piping 30 carries fuel 42 through dispenser sump 45 to the fuel dispenser 10 for eventual delivery. Those of skill in the art will appreciate that dispenser sump 45, which may also be double-walled, is adapted to capture any leaked fuel 42 that drains from fuel dispenser 10 and its fuel handling components so that fuel 42 is not leaked into the ground.

Main fuel piping 30 may then pass into housing 12 through a product line shear valve 46. As is well known, product line shear valve 46 is designed to close the fuel flow path in the event of an impact to fuel dispenser 10. U.S. Pat. No. 8,291,928, hereby incorporated by reference in its entirety for all purposes, discloses an exemplary secondarily-contained shear valve adapted for use in service station environments. Product line shear valve 46 contains an internal fuel flow path to carry fuel 42 from main fuel piping 30 to internal fuel piping 48, which may also be double-walled.

After fuel 42 exits the outlet of shear valve 46 and enters into internal fuel piping 48, it may encounter a flow control valve 50 positioned upstream of a flow meter 52. In some prior art fuel dispensers, valve 50 may be positioned downstream of the flow meter 52. In one embodiment, valve 50 may be a proportional solenoid controlled valve, such as described in U.S. Pat. No. 5,954,080, hereby incorporated by reference in its entirety for all purposes.

Flow control valve 50 is under control of a control system 54 via a flow control valve signal line 56. In this manner, control system 54 can control the opening and closing of flow control valve 50 to either allow fuel to flow or not flow through meter 52 and on to the hose 14 and nozzle 16. Control system 54 may be any suitable electronics with associated memory and software programs running thereon whether referred to as a processor, microprocessor, controller, microcontroller, or the like. In a preferred embodiment, control system 54 may be comparable to the microprocessor-based control systems used in CRIND and TRIND type units sold by Gilbarco Inc. Control system 54 typically controls other aspects of fuel dispenser 10, such as valves, displays, and the like as is well understood. For example, control system 54 typically instructs flow control valve 50 to open when a fueling transaction is authorized. In addition, control system 54 may be in electronic communication with a site controller 26 via a fuel dispenser communication network 58. Communication network 58 may be any suitable link, such as two wire, RS 422, Ethernet, wireless, etc. as needed or desired. Site controller 26 communicates with control system 54 to control authorization of fueling transactions and other conventional activities. The site controller functions may preferably be provided by the PASSPORT® point-of-sale system manufactured by Gilbarco Inc.

The memory of control system 54 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 54 may also include a portion of memory accessible only to control system 54.

Flow control valve 50 is contained below a vapor barrier 60 in a hydraulics compartment 62 of fuel dispenser 10. Control system 54 is typically located in an electronics compartment 64 of fuel dispenser 10 above vapor barrier 60. After fuel 42 exits flow control valve 50, it typically flows through meter 52, which preferably measures the flow rate of fuel 42. In some embodiments, meter 52 may be capable of measuring the density and/or temperature of the flowing fuel.

Flow meter 52 may be any suitable flow meter known to those of skill in the art, including positive displacement, inferential, and Coriolis mass flow meters, among others. Meter 52 typically comprises electronics 66 that communicates information representative of the flow rate, density, and/or temperature of fuel to control system 54 via a signal line 68. For example, electronics 66 may typically include a pulser as known to those skilled in the art. In this manner, control system 54 can update the total gallons (or liters) dispensed and the price of the fuel dispensed on information display 20.

As fuel leaves flow meter 52 it enters a flow switch 70. Flow switch 70, which preferably comprises a one-way check valve that prevents rearward flow through fuel dispenser 10, generates a flow switch communication signal via flow switch signal line 72 to control system 54 to communicate when fuel 42 is flowing through flow meter 52. The flow switch communication signal indicates to control system 54 that fuel is actually flowing in the fuel delivery path and that subsequent signals from flow meter 52 are due to actual fuel flow.

After fuel 42 enters flow switch 70, it exits through internal fuel piping 48 to be delivered to a blend manifold 76. Blend manifold 76 receives fuels of varying octane levels from the various USTs and ensures that fuel of the octane level selected by the customer is delivered. After flowing through blend manifold 76, fuel 42 passes through fuel hose 14 and nozzle 16 for delivery to the customer's vehicle.

In this case, fuel dispenser 10 comprises a vapor recovery system to recover fuel vapors through nozzle 16 and hose 14 to return to UST 28. An example of a vapor recovery assist equipped fuel dispenser is disclosed in U.S. Pat. No. 5,040,577, incorporated by reference herein in its entirety for all purposes. More particularly, flexible fuel hose 14 is coaxial and includes a product delivery line 78 and a vapor return line 80. Both lines 78 and 80 are fluidly connected to UST 28 through fuel dispenser 10. Lines 78 and 80 diverge internal to dispenser 10 at manifold 76, such that product delivery line 78 is fluidly coupled to internal fuel piping 48 and vapor return line 80 is fluidly coupled to internal vapor return piping 82. During delivery of fuel into a vehicle's fuel tank, the incoming fuel displaces air in the fuel tank containing fuel vapors. Vapor may be recovered from the vehicle's fuel tank through vapor return line 80 and returned to UST 28 with the assistance of a vapor pump 84. A motor 86 may operate vapor pump 84. Internal vapor return piping 82 is coupled to a vapor flow meter 88. Vapor flow meter 88, which measures vapor collected by the nozzle 16 when fuel 42 is dispensed, may be used for in-station diagnostics and monitoring or control of vapor recovery. In some embodiments, vapor flow meter 88 may also be a Coriolis mass flow meter.

After the recovered vapor passes through vapor flow meter 88, the recovered vapor passes to vapor line shear valve 90 (which may be analogous to product line shear valve 46). Finally, the recovered vapor returns to UST 28 via vapor return piping 92. Vapor return piping 92 is fluidly coupled to the ullage 94 of UST 28. Thus, the recovered vapor is recombined with the vapor in ullage 94 to prevent vapor emissions from escaping to the atmosphere. The vapors recombine and liquefy into fuel 42.

As explained above, the use of breakaway couplings for protecting dispensing equipment, such as fuel dispenser 10, hose 14, and nozzle 16 described above, is generally known. However, the prior art has not contemplated or disclosed systems or methods for monitoring the use and operation of a breakaway coupling. In accordance with embodiments of the present invention, a breakaway coupling may be provided with a sensor assembly operative to detect both connection and separation, or decoupling, of the breakaway coupling members. In addition, in some embodiments, the sensor assembly may comprise communications electronics operative to communicate information regarding the status of the breakaway coupling to a local or remote device, such as but not limited to a site controller or cloud server. The sensor assembly may also comprise an alarm that is activated by a decoupling event in some embodiments. Further, some embodiments of the present invention preferably enable communication, monitoring, and recording (either locally or remotely) of other operation and/or maintenance data associated with the breakaway coupling and/or other associated equipment.

Figure 3:
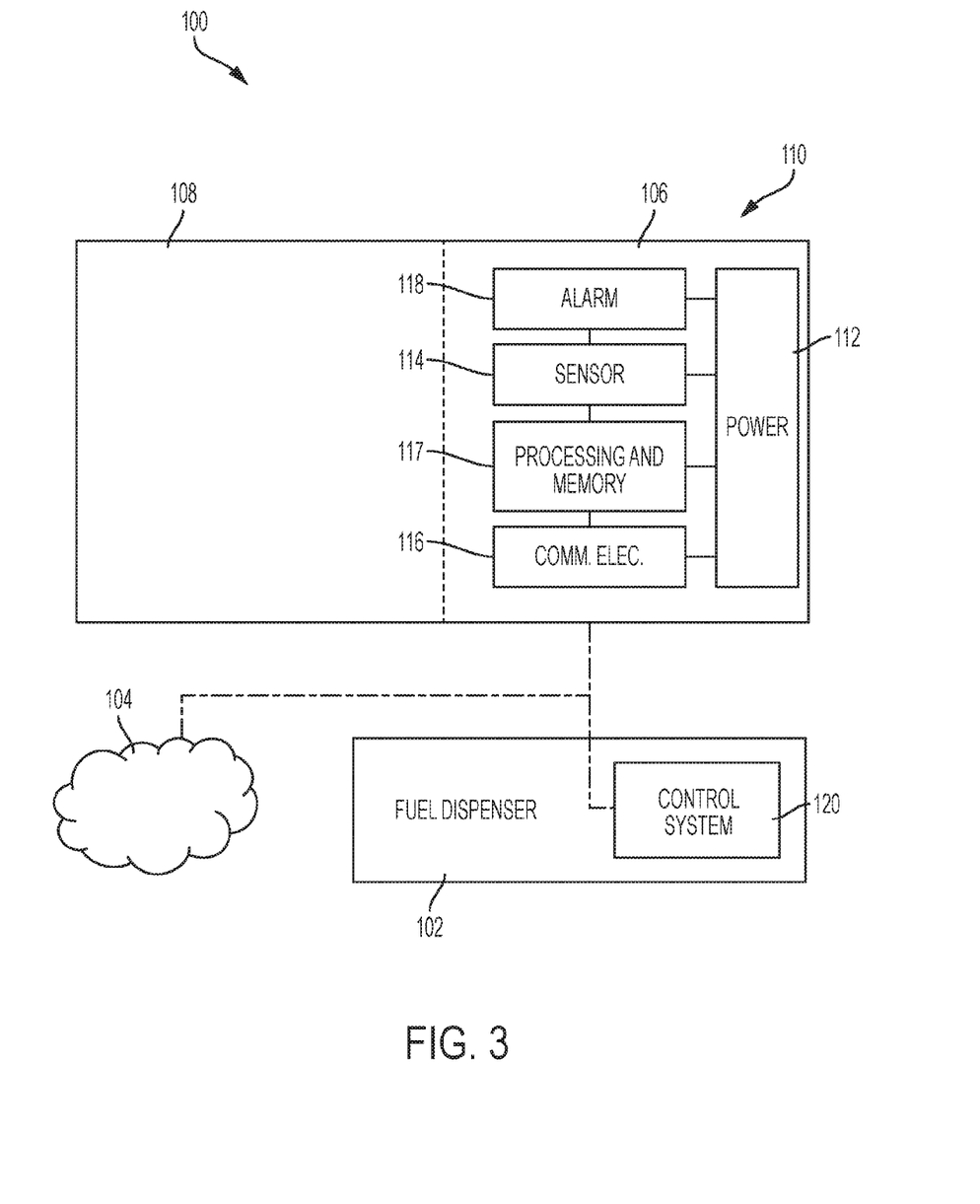
FIG. 3 is a block diagram of a breakaway coupling in communication with a fuel dispenser and a remote system according to one embodiment of the present invention.

In this regard, FIG. 3 is a block diagram of a breakaway coupling 100 in communication with a fuel dispenser 102 and a remote system 104 according to one embodiment of the present invention. Many different prior art breakaway constructions may be modified in accordance with embodiments of the present invention, and thus those of skill in the art will appreciate that breakaway coupling 100 is not limited to a specific type of breakaway connection. Breakaway coupling 100 may comprise any of the couplings disclosed in the patents incorporated by reference above, or another suitable breakaway coupling, but modified as discussed in more detail below. Thus, for example, depending on the needs or requirements of a particular dispensing environment, breakaway coupling 100 may be single- or dual-channel, may have any type of breakaway connection, and may be disposed at any point along the path of fuel flow between the fuel storage tank and the dispensing nozzle. Additional detail regarding the construction of other specific embodiments of a breakaway in accordance with the present invention is provided below with reference to FIGS. 4-5.

More particularly, in this embodiment breakaway coupling 100 may comprise a first body member 106 releasably coupled with a second body member 108. Body member 106 preferably defines one or more fluid flow paths which, when body member 106 is coupled with body member 108, are in fluid communication with one or more fluid flow paths defined in body member 108. In some embodiments, for example, first body member 106 may be connected to an outlet of fuel dispenser 102, or a short hose extending therefrom. Second body member 108 may be connected to the proximal end of a flexible fuel hose, the distal end of which is connected to a fuel dispensing nozzle. In other embodiments, first body member 106 may be connected to the distal end of the hose and second body member 108 may be connected to the fuel dispensing nozzle itself. In any event, body members 106, 108 are preferably operative to de-couple when a predetermined tensile force is applied to second body member 108 to protect fuel dispenser 102 from damage.

As shown, breakaway coupling 100 comprises a sensor assembly 110, which in this embodiment is disposed primarily within first body member 106. It is contemplated that that, in various embodiments, sensor assembly 110 may be incorporated within or attached to breakaway coupling 100 either during manufacture or installation, or it may be provided as a retrofit kit. It will thus be appreciated that, in some embodiments, sensor assembly 110 may be at least partially, and in some cases entirely, disposed exterior to breakaway coupling 100. Also, in some embodiments, components of sensor assembly 114 may be located in both first body member 106 and in second body member 108.

In this embodiment, sensor assembly 110 comprises a power supply 112 in electrical communication with at least one sensor 114, communications electronics 116, and an alarm device 118. Sensor assembly 110 may further comprise processing circuitry 117, which may comprise one or more processors, microprocessors, programmable logic devices, or other processing components, and volatile and/or non-volatile memory component(s) that store information accessible to processing circuitry 117. Processing circuitry 117 may be in electronic communication with sensor 114 and communications electronics 116, though this is not required in all embodiments. In other embodiments, processing circuitry 117 may be a part of sensor 114, communications electronics 116, and/or alarm device 118. Further, in some embodiments, one or more separate memory devices may be provided in sensor assembly 110. Still, it will be appreciated that, in yet other embodiments, any or all of power supply 112, alarm 118, and processing circuitry 117 may not be provided in sensor assembly 110. In these embodiments, sensor 114 may be in wireless electronic communication with processing circuitry 117 or another remote device via a suitable wireless communications protocol.

Power supply 112 may be any suitable source of power operative to power the electronic components in breakaway coupling 100. Those of skill in the art can select a suitable power source 112 based on a given system's configuration and power requirements. For example, in one embodiment, power source 112 may comprise a battery, capacitor, or another energy storage device. In another embodiment, power source 112 may not be provided, and the electronic components of breakaway coupling 100 may receive power through a connection to fuel dispenser 102. In still other embodiments, power source 112 may be operative to power other devices associated with fuel dispenser 102 or its hanging hardware, such as electronic components disposed within the fueling nozzle.

Sensor 114 is operative to detect separation and reconnection of body members 106 and 108. Thus, for example, sensor 114, which in this embodiment is located in body member 106, may sense the presence and/or absence of body member 108. In other embodiments, portions or components of sensor 114 may be located in both body member 106 and in body member 108. Further, sensor 114 may comprise more than one individual sensor in some embodiments. Sensor 114 may be any suitable sensor familiar to those of skill in the art for detecting the position of a component or whether the component is present or absent. For instance, as discussed in more detail below with reference to FIGS. 4 and 5, sensor 114 may be a sensor comprising a transducer operative to output a signal representative of a change in a magnetic field, such as a Hall Effect sensor, or sensor 114 may be a sensor which is actuated by physical contact with a portion of body member 108.

In other embodiments, optical, infrared, and/or acoustic sensors are also contemplated for sensor 114. Where sensor 114 is an optical sensor, for example, it may emit an electromagnetic signal (which in some embodiments may have a wavelength corresponding to the visual range) that, when interrupted or broken, may communicate to communications electronics 116 that decoupling has occurred. When the signal is restored, the optical sensor may communicate to communications electronics 116 that body members 106, 108 have been reconnected. Those of skill in the art are familiar with and can select a suitable optical sensor for this purpose, including but not limited to electro-optical sensors, photoelectric sensors, and infrared sensors.

Where sensor 114 is an acoustic sensor, it may be any transducer suitable for sensing, measuring, monitoring, and/or capturing the characteristics of acoustic waves (including sound waves and vibrations). The term "acoustic" is used herein to refer to mechanical waves propagating through a variety of media, including within the components themselves, within a liquid, and propagating through the air. In other words, those of skill in the art will appreciate that the use of the term "acoustic sensors" is not limited to sensors able to monitor and/or capture characteristics of acoustic waves at a particular frequency or range of frequencies. Rather, this term is used broadly herein to refer to sensors capable of monitoring and/or capturing acoustic wave characteristics at any frequency, including but not limited to infrasound, sound, and ultrasound frequencies.

Those of skill in the art are capable of selecting a suitable acoustic sensor for use in embodiments of the present invention. In one example, the acoustic sensors may be measurement microphones, hydrophones, sound level meters, or vibration meters capable of converting sound waves and vibrations to electrical signals. Condenser, piezoelectric, fiber optic, and laser microphones, among others, may be used for this purpose. In another embodiment, the acoustic sensors may be ultrasonic sensors able to monitor and capture the characteristics of acoustic waves with frequencies between about 20 kHz and about 2 MHz. In one embodiment, the sensor may comprise a transducer which emits an ultrasonic sound wave that may, for example, reflect off of body member 108 and be detected at a receiver in body member 106. Where the ultrasonic signal is received as expected, sensor 114 may determine that body members 106, 108 are connected and communicate this information to communications electronics 116. Where the signal is not received or is otherwise disrupted, sensor 114 may communicate to communications electronics 116 that body members 106, 108 have been decoupled.

Communications electronics 116 preferably comprise the hardware and/or software necessary to transmit information regarding breakaway assembly 100, such as status, operational, or maintenance information, to local or remote devices or systems. In this embodiment, for example, communications electronics 116 are in wireless electronic communication with remote system 104 and with a control system 120 of fuel dispenser 102. Remote system 104 may be analogous to site controller 26, mentioned above, or may instead be a remote server or cloud server, among other devices and systems. Control system 120 may be analogous to control system 54, described above. It will be appreciated that wireless communication is not required, and in other embodiments communications electronics 116 may be in wired communication with either or both of remote device 104 and control system 120.

Those of skill in the art can select suitable communications electronics for use in embodiments of the present invention. Where communications electronics 116 are operative to communicate wirelessly, communications electronics 116 may comprise a transmitter and a receiver in electronic communication with one or more antennas. The wireless communications may conducted pursuant to a suitable wireless communications standard, such as the radio frequency communications standards IEEE 802.11, IEEE 802.15.4, ANT, UWB, Bluetooth, ZigBee, and Wireless USB, HSPA+, and LTE, among many others. Communications electronics 116 may also utilize RFID communications, and in some embodiments communications electronics 116 may comprise a transponder configured for remote electronic communication with an interrogator associated with fuel dispenser 102.

Based on the above, operation and/or maintenance data associated with breakaway coupling 100 and/or other associated equipment may be communicated, monitored, and recorded. In one embodiment, information regarding breakaway coupling 100 may be stored in the memory of processing circuitry 117 during manufacture or installation. This information may include, but is not limited to, identifying indicia (e.g., product code, model number, serial number), warranty information, and the manufacture date of breakaway coupling 100. After breakaway coupling 100 is installed, processing circuitry 117 may transmit any or all of this information to communications electronics 116, which may communicate the transmitted information to control system 120 and/or remote system 104. The information may be stored in those locations and/or transmitted to other devices and systems. Thereby, for example, breakaway coupling 100 may be registered with fuel dispenser 102, on the network of a fuel dispensing site, and/or with the manufacturer. Once breakaway coupling 100 is registered, control system 120 and/or remote system 104 may monitor and record information regarding the installation or manufacture date of breakaway coupling 100, the length of time breakaway 100 has been in use, the particular fuel dispenser 102 (and/or dispensing hose and nozzle) with which breakaway coupling 100 is associated, the location of the fuel dispensing site at which breakaway coupling 100 is installed, reinstallation of breakaway coupling 100 at a different fuel dispenser or location, and the warranty associated with breakaway coupling 100, among other information.

Further, sensor assembly 110 is preferably operative to store and/or communicate information regarding the usage and operation of breakaway coupling 100. For instance, processing circuitry 117 may store in memory information regarding each decoupling event that occurs (e.g., the time, total count, etc.), each time the body members of breakaway coupling 100 are reconnected, whether the body members of breakaway coupling 100 are currently connected or disconnected, and/or each time alarm 118 is actuated. Further, communications electronics 116 may periodically communicate this information to control system 120 and/or remote system 104, or control system 120 and/or remote system 104 may periodically request this information from sensor assembly 110.

Moreover, sensor assembly 110 may store and/or communicate information regarding other equipment in the fuel dispensing environment. In this regard, in some embodiments, sensor assembly 110 may be in electronic communication with the fuel dispensing nozzle with which it is associated. Sensor assembly 110 may preferably store and/or communicate information it receives regarding the nozzle, such as identifying indicia (e.g., product code, model number, serial number), warranty information, manufacture date, or any other information. Further, in some embodiments, sensor assembly 110 may store information regarding fuel dispenser 102, any component thereof, or the location at which it is installed.

Figure 4:
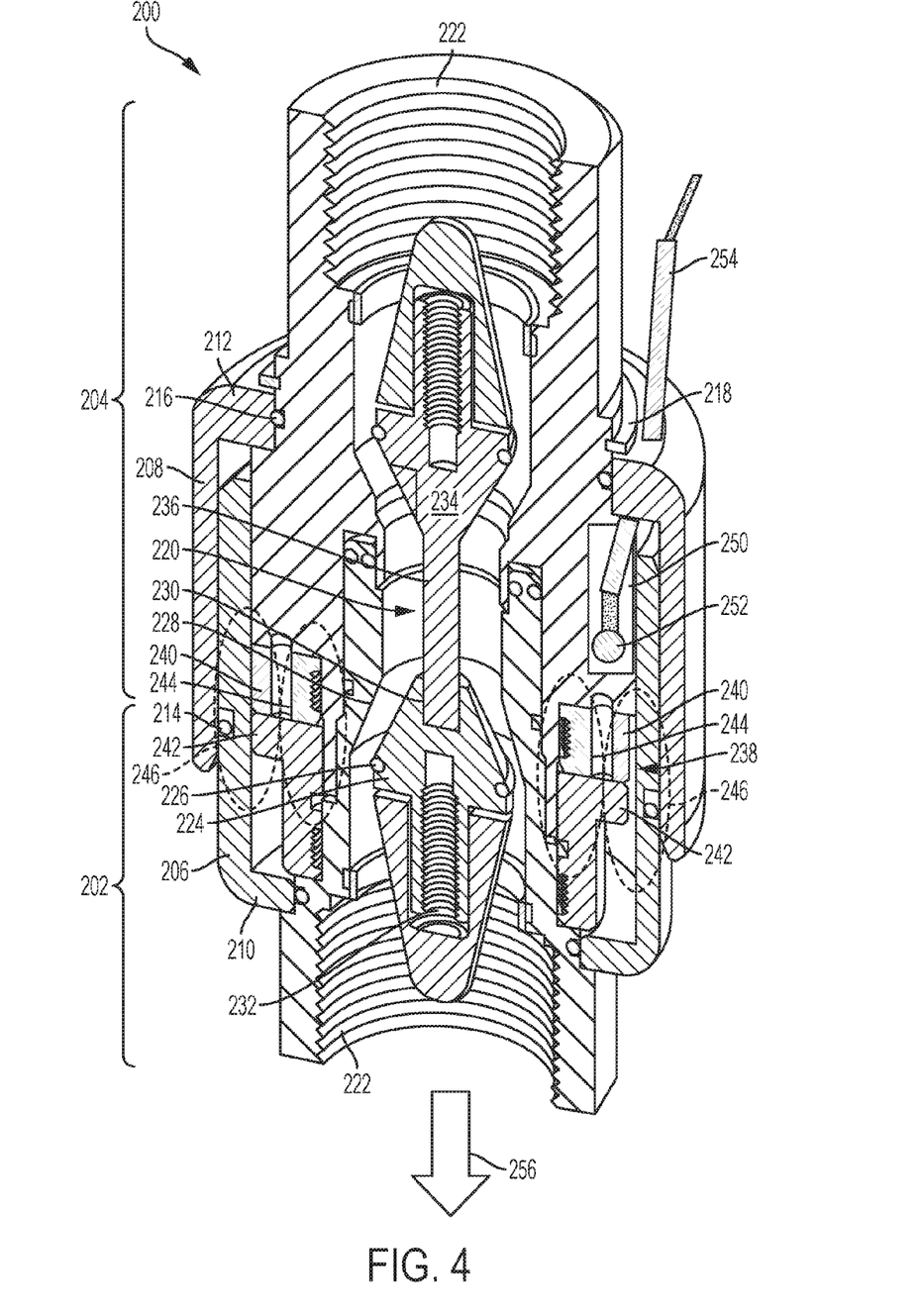
FIG. 4 is a perspective cross-section of a breakaway coupling according to another embodiment of the present invention.

FIG. 4 is a perspective cross-section of a breakaway coupling 200 according to another embodiment of the present invention. In general, certain aspects of the construction of coupling 200 may be analogous to the magnetic breakaway couplings described in the above-mentioned U.S. Pat. No. 7,252,112, but modified in accordance with embodiments of the present invention. Breakaway coupling 200 comprises a tubular male body member 202 and a tubular female body member 204 shown in their coupled or connected position. Body members 202, 204 may be formed of a suitable metal material, such as aluminum, and are partially surrounded by interfitting annular or cylindrical sleeves or covers 206, 208, respectively. Covers 206, 208 may be formed of molded semi-rigid plastic material, such as nylon. Cover 206 has an end portion 210 which mounts on body member 202 against an annular shoulder, and cover 208 has an end portion 212 which mounts on a cylindrical surface of body member 204. Cover 206, which is received within cover 208, defines an external groove which carries a resilient sealing ring or O-ring 214 which forms a fluid tight seal between covers 206, 208. Body member 204 defines an external groove which receives a resilient sealing ring or O-ring 216 which forms a fluid-tight seal between body member 204 and outer cover 208, which is secured by a spring retaining ring 218.

Body members 202 and 204 define an internal fuel supply passage 220 and each comprise outer end portions defining internal threads 222 for receiving threaded fittings, for example, on the end of a short fuel supply hose (not shown) extending from a fuel pump or dispenser and on a fuel supply hose (not shown) extending to a fuel dispensing nozzle. A valve member 224 is supported for axial movement within the center of the fuel supply passage 220, and may be analogous to the valve member disclosed in above-mentioned U.S. Pat. No. 6,899,131. Valve member 224 may define a conical inner end portion extending from an annular groove which receives a resilient sealing or O-ring 226 for engaging a tapered valve seat 228 formed within the body member 202. The conical inner end portion of valve member 224 may define a bore 230. A compression coil spring 232 coupled with valve member 224 normally urges valve member 224 to a closed position where the sealing ring 226 engages the tapered valve seat 228.

Body member 204 also supports an internal valve member 234 that is generally similar in construction to valve member 224. However, valve member 234 also comprises an inner center pin portion 236 sized for receipt in bore 230 of valve member 224. Valve members 224, 234 may be molded of a rigid plastic material such as an acetal and are normally retained in their retracted open positions, as shown, when body members 202 and 204 are connected together. Background regarding the operation of valve members 224 and 234 from open positions to closed positions in response to separation of the body members 202 and 204 is provided in above-mentioned U.S. Pat. No. 6,899,131.

Body members 202 and 204 are releasably connected together by a magnetic coupling system 238 that, in the illustrated embodiment, comprises an annular permanent magnetic member 240 and an annular strike member 242, both of which may be formed of a plated ferrous material or steel. In any event, strike member 242 may preferably be formed of a magnetically permeable material. The members 240 and 242 may be secured to their corresponding body members 204 and 202 by internal threads. Annular magnetic member 240 comprises a plurality of circumferentially spaced, arcuate permanent magnets 244 which are recessed within an annular groove formed within member 240. Magnets 244 may be formed of a rare earth material such as neodymium iron boron, and they may be arranged with common poles on the inside diameter and common poles on the outside diameter, with small gaps between the magnets. A schematic representation of the magnetic field of magnet member 240 is represented by reference numeral 246.

In the illustrated embodiment, magnetic attraction between permanent magnet member 240 and the strike member 242 provides for an attraction of substantial force that requires a tension force greater than 100 pounds to separate or pull the body members 202 and 204 apart. In some embodiments, the attraction force may require more than 200 pounds and on the order of about 240 pounds of tension force to separate the body members 202 and 204. After body members 202 and 204 have been separated as a result of the axial tension force, it will be appreciated that the magnetic coupling system 238 provides a convenient means for reconnecting the body members with only a small force to overcome the forces exerted by the springs 232 and the O-ring friction when the body member 202 is inserted into the body member 204. The magnetic attraction then pulls the body members together.

In accordance with embodiments of the present invention, breakaway coupling 200 preferably comprises a sensor assembly 250, which is shown schematically in this embodiment. Sensor assembly 250 may be disposed within body member 204 and may be similar in many respects to sensor assembly 110 described above. In other embodiments, however, sensor assembly 250 may be disposed within body member 202. As shown, sensor assembly 250 comprises a sensor 252 operative to detect a change in a resultant magnetic field of magnet member 240 and strike member 242 at the time of and/or following a decoupling or reconnection of breakaway coupling 200. In particular, as noted above, when magnet member 240 is proximate strike member 242, which as noted above is preferably formed of a magnetically permeable material, a resultant magnetic field is formed that differs from magnetic field 246 when strike member 240 is not proximate magnet member 240. When a decoupling event occurs, strike member 242 separates from magnet member 240, and the resultant magnetic field changes as a result. Sensor 252 is operative to detect this change. In one embodiment, sensor 252 may be linear Hall Effect sensor or a Hall Effect switch, though those of skill in the art can select other sensors suitable for detecting changes in magnetic field 246.

In other embodiments, magnet member 240 may be disposed in or secured to body member 202 (and strike member 242 may be disposed in or secured to body member 204) such that, when a decoupling event occurs, magnet member 240 moves away from sensor 252 rather than remaining in a fixed position with respect thereto. Those of skill in the art will appreciate that this arrangement may provide for a greater change in the resultant magnetic field in some embodiments.

Sensor 252 may be in electronic communication with remote devices, systems, and/or networks (not shown) via a communication line 254. Communication line 254 extends from sensor assembly 250, through body member 204 and cover 208, and then extends exterior to breakaway coupling 200. In one embodiment, communication line 254 may extend to the control system of the fuel dispenser with which breakaway coupling 200 is associated or to the site controller of the fuel dispensing site. In other embodiments, communication line 254 may extend to a wireless transceiver or RFID transponder. Additionally, in some embodiments, power for the components of sensor assembly 250 may be provided via communication line 254.

Although in this embodiment breakaway coupling 200 is a magnetic breakaway, and thus magnetic field 246 sensed by sensor 252 is provided by magnetic coupling 238, other embodiments are contemplated in which the breakaway coupling is not a magnetic breakaway but sensor 252 is still used. In other words, embodiments of the present invention may use a magnetic field change sensor with breakaway couplings that do not have a magnetic breakaway coupling. For example, a magnetic field (generated by any suitable means, including electrically or by a permanent magnet) independent of the breakaway connection may be provided within the breakaway coupling in these embodiments.

In operation, body member 204 may be connected to a short hose connected to a fuel dispenser, and body member 202 may be connected to a fuel dispensing hose. (Thus, when fuel is dispensed, fuel may flow through breakaway coupling 200 in the direction indicated by arrow 256.) When body member 204 is connected with body member 202, sensor 252 may detect magnetic field 246, and information representative of the fact and date or time of connection, for example, may be stored in memory in sensor assembly 250 and/or communicated via communication line 254. Further, when a sufficient tensile force is applied to body member 202, thereby causing body members 202, 204 to decouple, sensor 252 may sense a change in and/or the absence of magnetic field 246. Information representative of the fact and date or time of disconnection, for example, may be stored in memory in sensor assembly 250. Further, this information may be communicated via communication line 254 to the control system of the fuel dispenser with which breakaway coupling 200 is associated, to a site controller, or to another device or system, so that appropriate personnel may be notified of the decoupling event. Moreover, as a result of the decoupling event, sensor assembly 250 may actuate an audible or electronic alarm.

Figure 5:
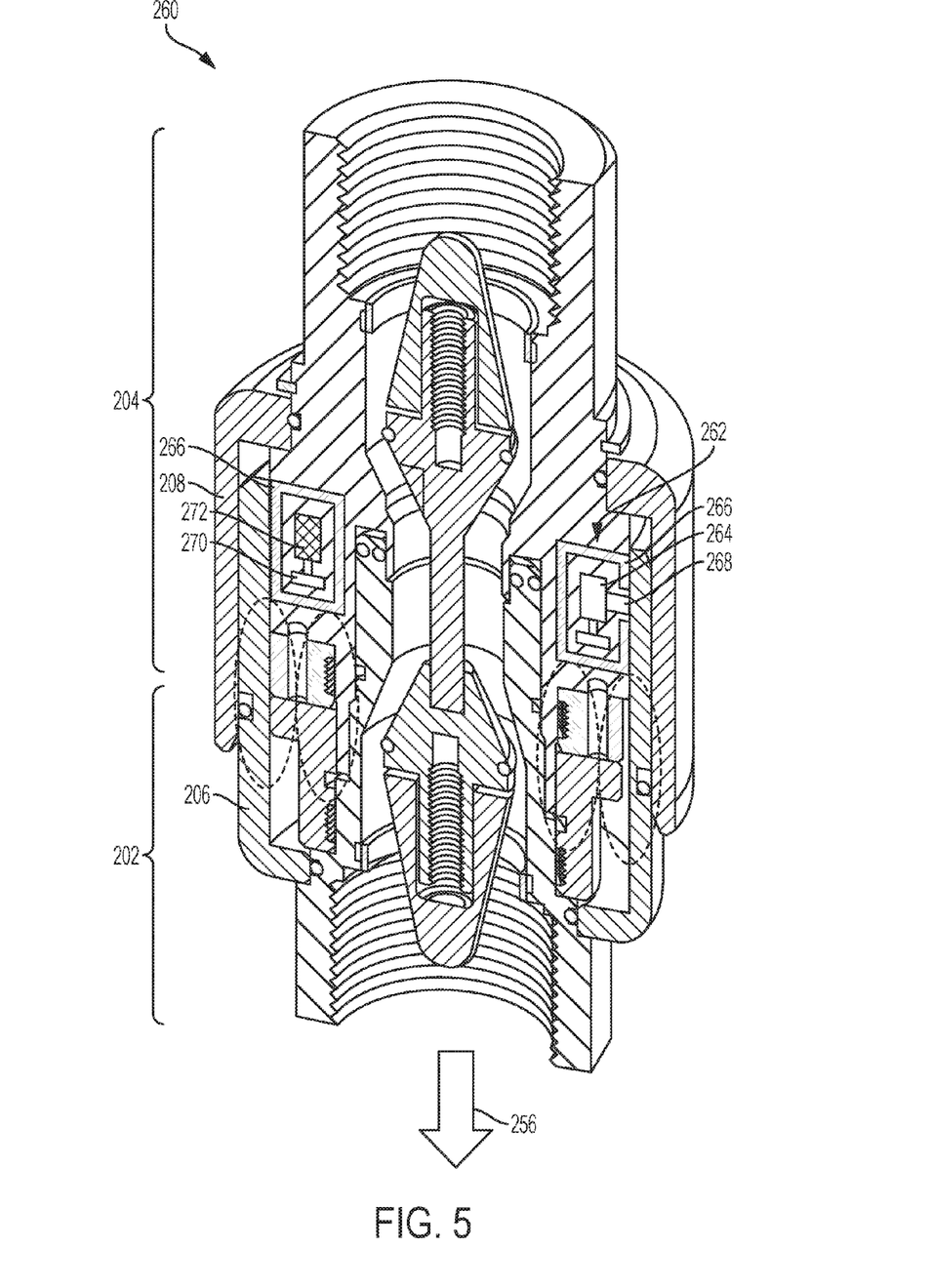
FIG. 5 is a perspective cross-section of a breakaway coupling according to yet another embodiment of the present invention.

FIG. 5 is a perspective cross-section of a breakaway coupling 260 according to yet another embodiment of the present invention. Breakaway coupling 260 may be in many respects analogous to breakaway coupling 200, and like parts are represented by like reference numerals. In this embodiment, however, breakaway coupling 260 comprises a sensor assembly 262 disposed in body member 204. Rather than comprising a magnetic sensor, sensor assembly 262 comprises a sensor 264 that is actuated based on physical contact with a portion of body member 202. Sensor assembly 262 may comprise an annular housing 266 that is rectangular in cross-section.

More particularly, in this embodiment, sensor 264 may be a transducer that detects separation and connection of body members 202, 204 based on movement of a switch member 268 between first and second positions. Switch member 268 may be normally biased toward an outward first position, in which switch member 268 extends through an aperture in housing 266. When body members 202, 204 are connected, as shown, cover 206 contacts switch member 268 and forces switch member 268 from the first position to a second, inward position in which switch member 268 may be generally flush with housing 266. On the other hand, when a sufficient tensile force is applied to body member 202 such that body members 202, 204 separate, cover 206 is no longer in contact with switch member 268. This allows switch member 268 to return to the first position, wherein sensor 264 indicates that body members 202, 204 are separated. Accordingly, sensor 264 may indicate whether body members 202, 204 are connected or disconnected based on the position of switch member 268.

Also as shown in FIG. 5, sensor assembly 262 may comprise a power supply 270 and an alarm device 272. In this embodiment, power supply 270 may comprise a battery, and alarm device 272 may comprise an audible horn.

In use, sensor assembly 262 is preferably operative to store and/or communicate information representative of the fact, date, and/or time that connection or disconnection of body members 202, 204 occurs based on signals from sensor 264. For example, when switch member 268 is moved from the first position to the second position, sensor 264 may transmit to processing circuitry and/or communications electronics in sensor assembly 262 a signal indicating that body members 202, 204 are connected. The processing circuitry may store this information, along with the date and/or time at which it is received, in memory. The communications electronics may also transmit this information to one or more remote devices or systems, as described above. A similar series of events may occur when switch member 268 is moved from the second position to the first position, thus indicating that a decoupling event has occurred. Further, as a result of the decoupling event, sensor assembly 262 may cause alarm device 272 to sound and/or notify appropriate personnel of the decoupling event via the communications electronics. Upon either coupling or decoupling, sensor assembly 262 may also update in memory and/or communicate a running count of the number of times breakaway coupling 260 has been coupled or decoupled. Sensor assembly 262 may also receive, communicate, and store other information as described above with reference to sensor assembly 110.

In still other embodiments of a breakaway coupling according to the present invention, a sensor assembly need not be disposed within either body member 202, 204. For example, the sensor assembly may comprise a cage formed of plastic material that surrounds the coupling, or the sensor assembly may be provided in either cover 206, 208. In one embodiment, a plastic cage may comprise an upper half releasably coupled with a lower half, the upper half being coupled with body member 204 and the lower half being coupled with body member 202. When a decoupling event occurs, a circuit extending between the upper and lower halves of the cage may become open, thus alerting appropriate personnel that the decoupling event has occurred. For example, a wire may extend through the upper half of the cage to be in electrical communication with contacts formed in the lower half of the cage. Those of skill in the art will appreciate that many variations of the foregoing embodiment are within the scope of the present invention.

It can thus be seen that embodiments of the present invention provide novel breakaway couplings and methods and systems for monitoring the operation and status of, and other information associated with, breakaway couplings and other associated equipment. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A coupling, comprising:
a first body member and a second body member;
a coupling system operative to releasably connect the first body member with the second body member via at least one permanent magnet mounted on one of the first and second body members and a strike member mounted on the other of the first and second body members, wherein the coupling system allows the second body member to move from a coupled position to an uncoupled position with respect to the first body member in response to a predetermined tensile force;
the first and second body members defining a fluid flow path therein when the second body member is in the coupled position; and
a sensor assembly coupled with the first body member and comprising at least one sensor operative to detect that the second body member has moved to the uncoupled position based on a change in a magnetic field of the at least one permanent magnet.

2. The coupling of claim 1, further comprising at least one valve member within at least one of the first and second body members that is movable between an open position and a closed position with respect to the fluid flow path.

3. The coupling of claim 1, the sensor assembly further comprising processing circuitry and memory.

4. The coupling of claim 1, the sensor assembly further comprising an alarm device.

5. The coupling of claim 4, wherein the alarm device comprises an audible alarm.

6. The coupling of claim 1, the sensor assembly further comprising communications electronics configured for electronic communication with a remote system.

7. The coupling of claim 6, wherein the remote system is a fluid dispenser control system.

8. The coupling of claim 6, wherein the remote system is a cloud server.

9. The coupling of claim 1, wherein the at least one sensor is disposed within the first body member.

10. A fluid dispenser, comprising:
a housing;
a control system;
a fluid flow path terminating at a fluid dispensing nozzle;

a coupling disposed along the fluid flow path upstream of the fluid dispensing nozzle and downstream of the housing, the coupling comprising a first body member and a second body member, the first and second body members releasably connected together via at least one permanent magnet coupled with one of the first and second body members and a strike member coupled with the other of the first and second body members;

wherein the first and second body members are operative to disconnect from one another in response to a predetermined force; and the coupling further comprising:
 a sensor that is operative to sense whether the first and second body members are connected together based on a magnetic field of the at least one permanent magnet; and
 communications electronics in electronic communication with the control system.

11. The fluid dispenser of claim 10, wherein the fluid dispenser is operative to dispense liquid fuel.

12. The fluid dispenser of claim 10, wherein said coupling is connected between a fluid dispensing hose and the housing.

13. The fluid dispenser of claim 10, wherein the communications electronics are operative to notify the control system when the second body member is separated from the first body member.

14. A coupling, comprising
 a first body member and a second body member, the first and second body members operative to releasably connect together via at least one permanent magnet mounted on one of the first and second body members and a strike member mounted on the other of the first and second body members;
 the first and second body members defining a fluid flow path therein when the first and second body members are connected together;
 the first and second body members operative to disconnect from one another in response to a predetermined tensile force;
 at least one valve member within at least one of the first and second body members that is movable from an open position to a closed position with respect to the fluid flow path upon disconnection of the first body member from the second body member; and
 a sensor disposed within one of the first and second body members that is operative to sense whether the first and second body members are connected together based on a magnetic field of the at least one permanent magnet.

15. The coupling of claim 14, wherein the sensor is operative to sense that the first body member is disconnected from the second body member.

16. The coupling of claim 15, further comprising communications electronics in electronic communication with the sensor.

17. The coupling of claim 16, wherein the sensor is operative to notify the communications electronics that the first body member is disconnected from the second body member.

18. The coupling of claim 14, wherein the at least one sensor is a Hall Effect sensor.

19. The coupling of claim 14, wherein the coupling system comprises a detent ring.

* * * * *